(12) United States Patent
Rouzier et al.

(10) Patent No.: US 11,987,012 B2
(45) Date of Patent: May 21, 2024

(54) HOCKEY STICK FORMED FROM SHEET MOLDING COMPOUND

(71) Applicant: Bauer Hockey Ltd., Blainville (CA)

(72) Inventors: Edouard Rouzier, Montreal (CA); Martin Chambert, Piedmont (CA); Candide Deschenes, Saint-Jerome (CA)

(73) Assignee: Bauer Hockey, LLC, Exeter, NH (US)

( * ) Notice: Subject to any disclaimer, the term of this patent is extended or adjusted under 35 U.S.C. 154(b) by 683 days.

(21) Appl. No.: 16/576,843

(22) Filed: Sep. 20, 2019

(65) Prior Publication Data

US 2020/0094492 A1 Mar. 26, 2020

Related U.S. Application Data

(60) Provisional application No. 62/734,510, filed on Sep. 21, 2018.

(51) Int. Cl.
*B29C 70/08* (2006.01)
*A63B 59/70* (2015.01)
*B29C 70/30* (2006.01)
*B29C 70/68* (2006.01)
*A63B 102/02* (2015.01)
*A63B 102/14* (2015.01)
*A63B 102/18* (2015.01)
*A63B 102/22* (2015.01)
(Continued)

(52) U.S. Cl.
CPC ............ *B29C 70/081* (2013.01); *A63B 59/70* (2015.10); *B29C 70/30* (2013.01); *B29C 70/68* (2013.01); *A63B 2102/02* (2015.10); *A63B 2102/14* (2015.10); *A63B 2102/18* (2015.10); *A63B 2102/22* (2015.10); *A63B 2102/24* (2015.10); *A63B 2102/32* (2015.10); *A63B 2209/00* (2013.01); *A63B 2209/02* (2013.01); *B29L 2031/52* (2013.01)

(58) Field of Classification Search
CPC ....... A63B 59/70; B29C 70/345; B29C 70/68; B29C 70/081; B29L 2031/52
See application file for complete search history.

(56) References Cited

U.S. PATENT DOCUMENTS 3,615,979 A 10/1971 Davis, Sr. et al.
3,734,814 A * 5/1973 Davis, Sr. ............. B29C 70/542
156/289

(Continued)

FOREIGN PATENT DOCUMENTS

CA 2289988 A1 * 5/2001 ............. A63B 59/70
CA 2364399 A1 6/2003

OTHER PUBLICATIONS

Wikipedia, "Sheet moulding compound," https://en.wikipedia.org/wiki/Sheet_moulding_compound, archived by the Internet Archive on Feb. 22, 2017 (Year: 2017).*

(Continued)

*Primary Examiner* — Laura Davison
(74) *Attorney, Agent, or Firm* — Banner & Witcoff, Ltd.

(57) ABSTRACT

A construct for a hockey blade formed from layers of sheet molding compound material. The sheet molding compound material may be manufactured to have longer average fiber lengths entrained within the sheet molding compound material with random orientation in order to enhance the mechanical properties of the formed hockey stick blade.

28 Claims, 11 Drawing Sheets

(51) Int. Cl.
*A63B 102/24* (2015.01)
*A63B 102/32* (2015.01)
*B29L 31/52* (2006.01)

(56) References Cited

U.S. PATENT DOCUMENTS

| | | | |
|---|---|---|---|
| 4,076,240 A | 2/1978 | Haddad | |
| D264,863 S | 6/1982 | Walmsley | |
| 4,581,190 A * | 4/1986 | Nagamoto | A63B 60/00 |
| | | | 264/137 |
| D329,888 S | 9/1992 | Christian | |
| 5,217,221 A | 6/1993 | Baum | |
| 5,697,857 A | 12/1997 | Christian et al. | |
| 5,836,841 A | 11/1998 | Fell | |
| D412,544 S | 8/1999 | Burger | |
| 6,019,691 A | 2/2000 | Hilborn | |
| 6,062,996 A * | 5/2000 | Quigley | A63B 59/70 |
| | | | 473/563 |
| 6,183,383 B1 | 2/2001 | McSorley | |
| D484,555 S | 12/2003 | Bellefleur et al. | |
| 6,918,847 B2 | 7/2005 | Gans et al. | |
| 7,008,338 B2 | 3/2006 | Pearson | |
| 7,261,787 B2 | 8/2007 | Bellefleur et al. | |
| 7,294,072 B2 | 11/2007 | Montecchia | |
| 7,438,655 B2 | 10/2008 | Garcia | |
| 7,476,167 B2 * | 1/2009 | Garcia | A63B 59/70 |
| | | | 473/563 |
| D610,641 S | 2/2010 | Solin | |
| 7,824,591 B2 | 11/2010 | Gans | |
| D628,665 S | 12/2010 | Lake | |
| 7,963,868 B2 * | 6/2011 | McGrath | A63B 60/54 |
| | | | 473/563 |
| 8,608,597 B2 | 12/2013 | Avnery et al. | |
| 8,801,550 B2 | 8/2014 | Jeanneau et al. | |
| D716,882 S | 11/2014 | Champagne et al. | |
| 9,044,657 B2 | 6/2015 | Jeanneau | |
| D775,289 S | 12/2016 | Crouchen | |
| 9,868,038 B2 | 1/2018 | Villar et al. | |
| 10,099,100 B2 | 10/2018 | Caron Kardos et al. | |
| 2003/0104883 A1 * | 6/2003 | Caron | A63B 59/70 |
| | | | 473/560 |
| 2005/0090339 A1 | 4/2005 | Gans et al. | |
| 2005/0113194 A1 | 5/2005 | Pearson | |
| 2005/0176530 A1 | 8/2005 | Sartor et al. | |
| 2006/0089215 A1 | 4/2006 | Jean et al. | |
| 2012/0070301 A1 * | 3/2012 | Gans | B29C 70/342 |
| | | | 29/889.71 |
| 2013/0065714 A1 | 3/2013 | Avnery et al. | |
| 2016/0101542 A1 | 4/2016 | Kosaka et al. | |
| 2020/0346441 A1 * | 11/2020 | Seike | B29C 70/10 |

OTHER PUBLICATIONS

Sep. 24, 2021—(CA) Office Action—3056458.
Jan. 28, 2021—(CA) Office Action—3056458.
Feb. 21, 2023—(CA) Examiner's Report—App. No. 3,056,458.
Aug. 17, 2022—(CA) Examiner's Report—App. No. 3,056,458.

* cited by examiner

HOCKEY STICK FORMED FROM SHEET MOLDING COMPOUND

CROSS REFERENCE TO RELATED APPLICATION

This application claims priority to U.S. Provisional Patent Application No. 62/734,510, entitled "HOCKEY STICK FORMED FROM SHEET MOLDING COMPOUND," filed on Sep. 21, 2018, which is expressly incorporated herein by reference in its entirety for any and all non-limiting purposes.

FIELD

This disclosure relates generally to fabrication of molded structures. More particularly, aspects of this disclosure relate to hockey stick shafts and blades molded from a sheet molding compound material.

BACKGROUND

Hockey stick blades may be made from multiple layers of fiber-reinforced tape that are molded together using epoxy to form a blade structure. This molding process involves lengthy setup (draping) and curing times as a result of the use of the multiple layers of fiber-reinforced tape. Aspects of this disclosure relate to improved methods for production of a molded hockey stick, including molded shafts and blades.

SUMMARY

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

Aspects of the disclosure herein may relate to fabrication of a formed hockey blade structure. In one example, the formed hockey blade structure may include forming a sheet molding compound material by introducing randomly oriented fiber strands in between layers of resin paste and solidifying the resultant composition into a flexible sheet. The sheet molding compound material may be cut into preform layers, and the preform layers may be positioned in a mold. The mold may be heated and cooled to produce a formed hockey stick blade structure.

BRIEF DESCRIPTION OF THE DRAWINGS

The present disclosure is illustrated by way of example and not limited in the accompanying figures in which like reference numerals indicate similar elements and in which.

Further, it is to be understood that the drawings may represent the scale of different component of one single embodiment; however, the disclosed embodiments are not limited to that particular scale.

DETAILED DESCRIPTION

In the following description of various example structures, reference is made to the accompanying drawings, which form a part hereof, and in which are shown by way of illustration various embodiments in which aspects of the disclosure may be practiced. Additionally, it is to be understood that other specific arrangements of parts and structures may be utilized, and structural and functional modifications may be made without departing from the scope of the present disclosures. Also, while the terms "top" and "bottom" and the like may be used in this specification to describe various example features and elements, these terms are used herein as a matter of convenience, e.g., based on the example orientations shown in the figures and/or the orientations in typical use. Nothing in this specification should be construed as requiring a specific three-dimensional or spatial orientation of structures in order to fall within the scope of this invention.

Aspects of this disclosure relate to systems and methods for production of a hockey stick blade and/or the hockey stick shaft using a sheet molding compound (SMC), otherwise referred to as bulk molding compound (BMC). Additionally, aspects of this disclosure may also be applied to production of additional sporting implements using SMC/BMC, among others. These additional sporting implements may include, among others, tennis rackets (or other types of sports rackets), baseball bats, lacrosse sticks, golf clubs, or field hockey sticks, among others.

Figure 1:
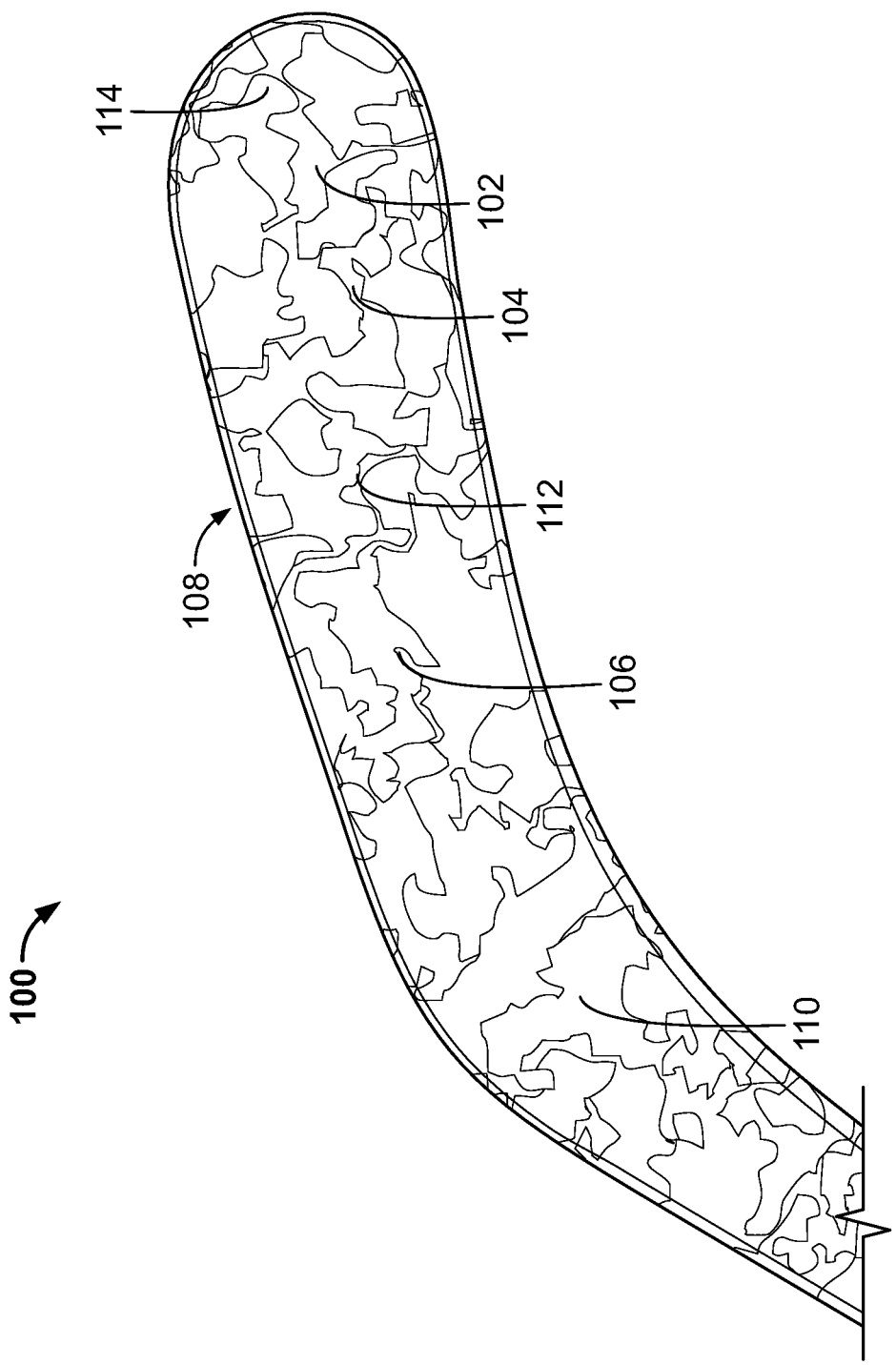
FIG. 1 depicts a perspective view of a hockey stick blade manufactured using sheet molding compound material, according to one or more aspects described herein.

FIG. 1 depicts a perspective view of a hockey stick blade 100. In particular, the hockey stick blade 100 may be produced using a sheet molding compound. In addition to the advantageous manufacturing and performance characteristics offered by the use of the sheet molding compound, this manufacturing methodology may produce a distinctive outer surface appearance. As depicted on the hockey stick blade 100, the outer surface appearance may be described as a "marbling," or as being similar to large grains of a metallic material. These outer surface grains, of which elements 102 are 104 are two examples, may result from the random orientation of fibers entrained with the sheet molding compound used to construct the hockey stick blade 100. This random orientation of fibers is described in further detail in the proceeding disclosures.

FIG. 1 further depicts a first outer face 106 of the hockey stick blade 100. A second outer face 108, opposite the first face 106, is not shown in FIG. 1 but may have similar surface features. The hockey stick blade 100 includes a heel region 110, a mid region 112, and a toe region 114. In one example, the manufacturing methodology that uses the sheet molding compound material may result in the first outer face 106 and the second outer face 108 having a high gloss surface finish on which the randomly oriented fibers entrained within the sheet molding compound material are visible as marbling or grain features, as previously described.

Figure 2:
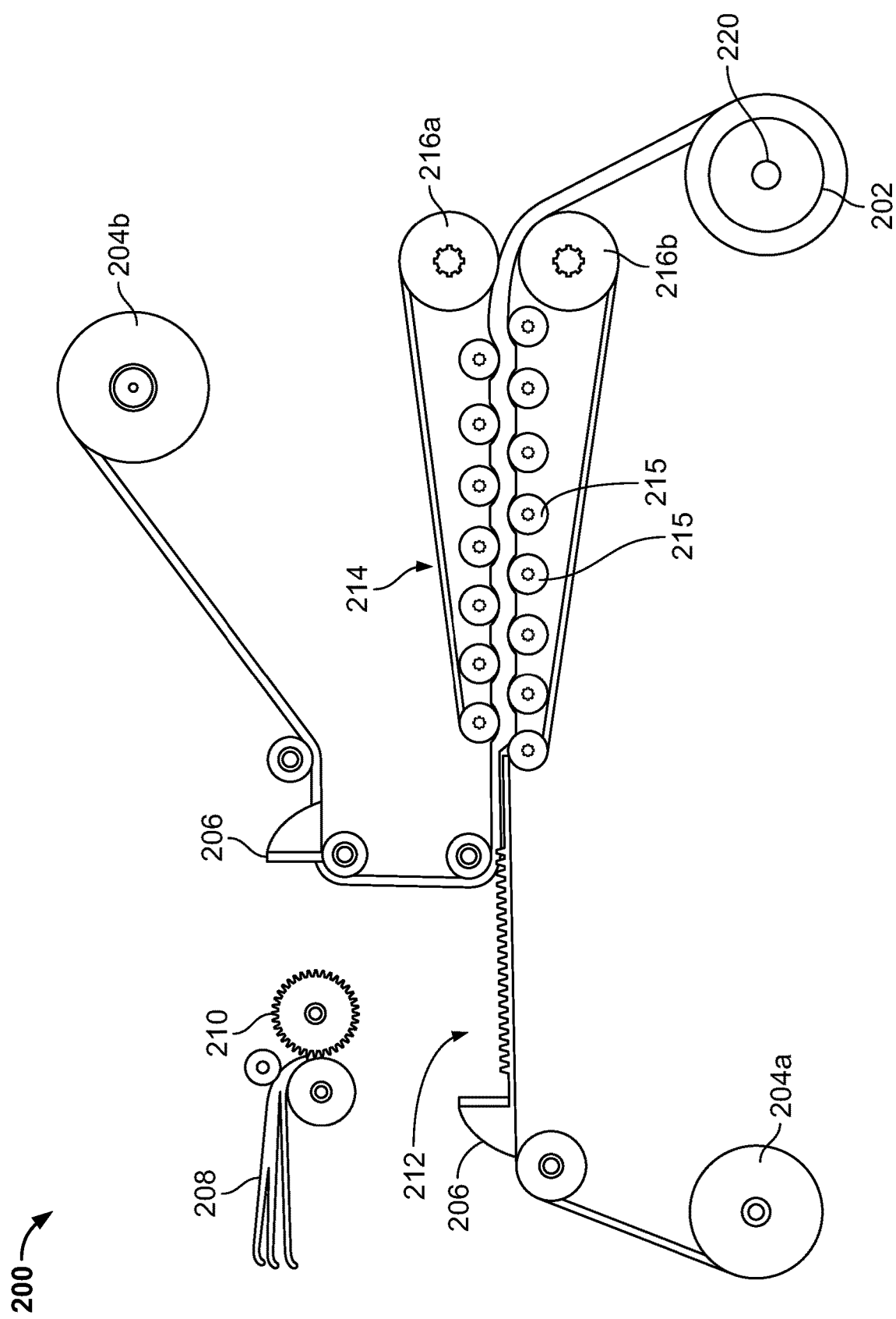
FIG. 2 schematically depicts a process for manufacturing a sheet molding compound material that may be used to manufacture hockey sticks, according to one or more aspects described herein.

FIG. 2 schematically depicts a process 200 for manufacturing a sheet molding compound 202 to be used to manufacture hockey sticks. It is contemplated that the schematic process depicted in FIG. 2 may include additional or alternative processing steps, without departing from the scope of these disclosures. It is further contemplated that where these disclosures describe the use of a polymer, any polymer or elastomer may be used, without departing from the scope of these disclosures. Further, where one or more specific polymers are described, it is contemplated that additional or alternative polymer materials may be used in combination with or as alternatives to the specific polymers, without departing from the scope of these disclosures. Accordingly, elements 204a and 204b schematically depict rolls of a carrier film. The carrier films 204a and 204b may be polymeric or metallic sheets that act as a platform onto which a resin paste 206 may be applied. The resin paste 206 may be a form of synthetic resin, which may include a thermosetting polymer or another resin type. The resin paste 206 may be heated and applied to the carrier film rolls 204a and 204b as a viscous liquid. The depth of the resin paste 206 when applied to the carrier film rolls 204a and 204b may have any value. Consequently, the sheet molding compound 202 produced by compressing the first carrier film 204a against the second carrier film 204b may have any thickness, without departing from the scope of these disclosures.

A continuous fiber structure (or multiple fibers of a same or differing material type) 208 may be cut to a desired length by a chopper mechanism 210 and the cut lengths of fiber 212 may be applied to the soft resin paste 206 supported on the carrier film 204a. Where described herein, a fiber may include carbon fibers, glass fibers, or Aramid material, among others. The cut fibers 212 may have any length values, or differing lengths, including random lengths, and may be applied to the resin paste 206 with random orientations. The compaction belt 214 may include a series of roller elements, of which roller elements 215 are two examples of a larger number of roller elements, configured to compress the layer of resin paste 206 carried on the first carrier film 204a against the layer of resin paste 206 carried on the second carrier film 204b. The compression may result in the formation of a single continuous sheet of sheet molding compound material 202 that entrains the randomly oriented fibers 212. This latter stage of the sheet molding compound manufacturing process may remove and recover the carrier film 204a and 204b on rolls 216a and 216b, before cooling and storing the finished sheet molding compound 202 on the depicted roller 220.

Figure 3:
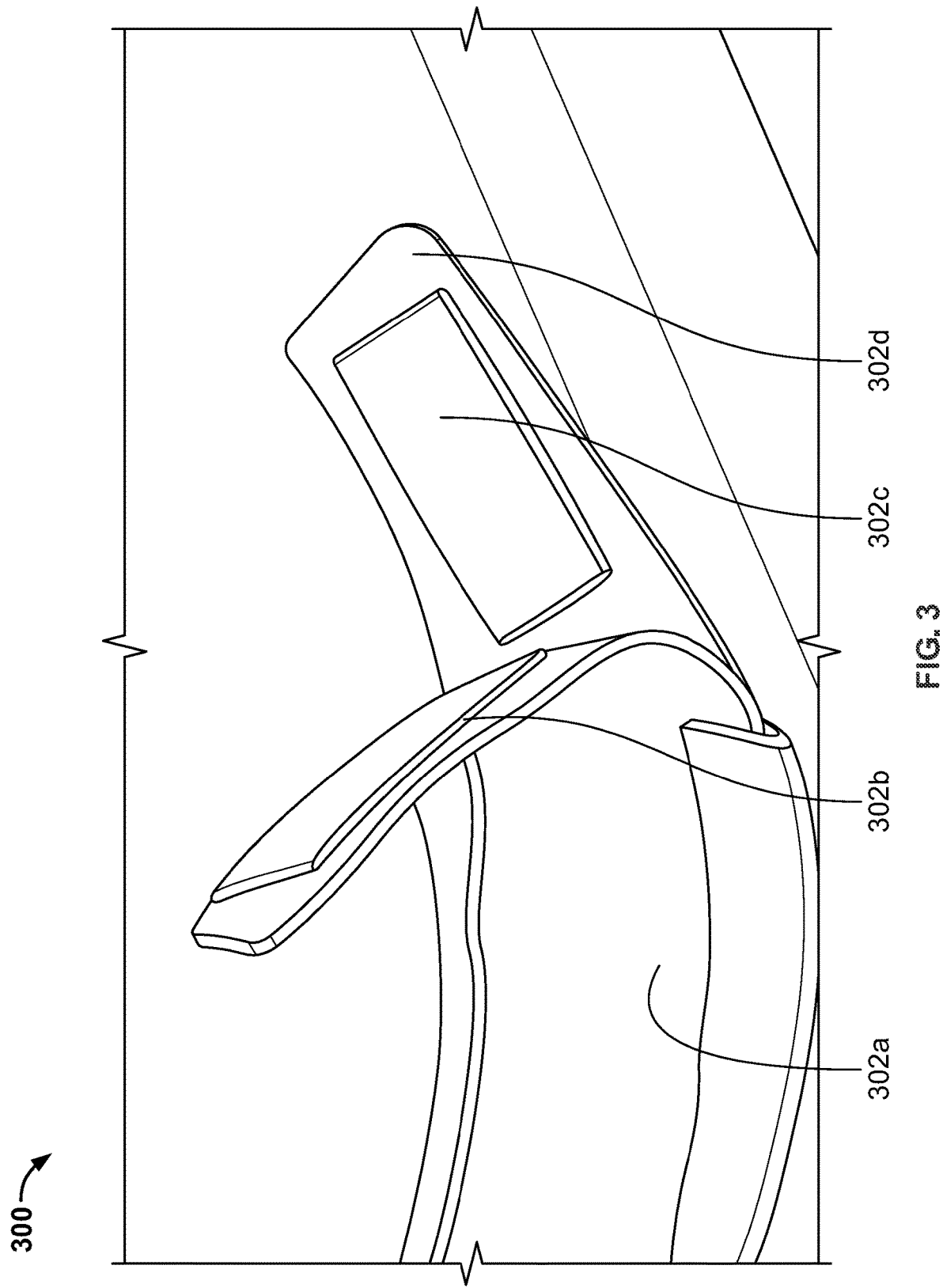
FIG. 3 depicts multiple layers of a sheet molding compound material that have been cut into preform layers that approximate the geometry of a hockey stick blade structure, according to one or more aspects described herein.

FIG. 3 depicts multiple layers 302a-302d of a sheet molding compound material that have been cut into preform layers that approximate the geometry of a hockey stick blade structure. In the depicted example of FIG. 3, four layers of sheet molding compound material 302a-302d may be used to construct a hockey stick blade preform 300 prior to molding. However, fewer than four or more than four layers may be used, without departing from the scope of these disclosures. Advantageously, the number of layers of sheet molding compound required to form a preform of a hockey stick blade 300 may be less than a number of layers of pre-impregnated carbon layers or layers of fiber tape that may be used in alternative hockey stick blade manufacturing processes. Consequently, the time required to cut, position, and mold the sheet molding compound material layers 302a-302d may be less than that required for a hockey stick blade manufactured using layers of fiber tape. As such, the use of the sheet molding compound material may reduce the manufacturing cost of a hockey stick blade when compared with manufacturing processes that only use layers of fiber tape. In one example, the number of layers of sheet molding compound material may be approximately equal to, or more than, an order of magnitude less than a number of layers of fiber tape required to construct a similarly sized hockey stick blade. In one specific example, a hockey stick blade constructed using conventional fiber tape may use approximately 40 layers of fiber tape, compared with 4 layers 302a-302d of sheet molding compound material used in the hockey stick blade preform 300.

It is noted that the geometries of the layers of sheet molding compound material 302a-302d are depicted as one example implementation of the use of sheet molding compound material, and additional or alternative geometries may be used, without departing from the scope of these disclosures. Further, the hockey stick blade preform 300 may additionally include a foam core material (not depicted in FIG. 3), which is positioned between layers of the sheet molding compound material 302a-302d. For example, a foam core may be positioned between the depicted layers 302b and 302c. Additionally or alternatively, the hockey stick blade preform 300 may include one or more bridge elements configured to provide enhanced durability at specific areas of the hockey stick blade. The hockey stick blade preform 300 may additionally or alternatively include one or more inserts and/or one or more pre-cured segments that are also formed from fiber-reinforced material and epoxy. These additions to the preform 300 may be configured to enhance the strength and/or durability of the resulting hockey stick blade, to reduce the mass of the preform 300, and/or to reduce the manufacturing and processing time associated with the production of a molded hockey stick blade. For example, the use of pre-cured segments and/or elements that do not need to be cured (such as polymeric inserts, foam core, and the like), may reduce the overall curing time of the hockey stick blade.

The methodology described herein may additionally include the use of one or more layers of fiber tape material. Accordingly, where described herein, fiber tape may be pre-impregnated with resin, or may have resin applied separately. Further, while the sheet molding compound material described herein may include fibers that are randomly oriented, the fiber tape may include fibers that are predominantly oriented along a single axis or along two mutually perpendicular axes. As such, fiber tape may be described as unidirectional or bidirectional, and may exhibit a first set of mechanical properties in one direction, and a second set of different mechanical properties in another direction. In contrast, the sheet molding compound material may exhibit similar mechanical properties in multiple directions. In this way, the sheet molding compound material may more closely approximate an isotropic material.

In one example, one or more layers of fiber tape (not depicted in FIG. 3) may be combined with the layers of sheet molding compound material 302a-302d depicted in FIG. 3 to result in a hockey stick blade preform 300 that combines the mechanical properties of sheet molding compound material with those of fiber tape, once molded into a hockey stick blade. For example, adding one or more layers of fiber tape to the hockey stick blade preform 300 may increase the mechanical toughness of a molded hockey stick blade, and thereby increase the blade's impact resistance. It is contemplated that the one or more layers of fiber tape may be positioned anywhere in or on the hockey stick blade preform 300. For example, one or more layers of fiber tape may be positioned between each layer of sheet molding compound material 302a-302d, or between a sub-set of the total number of sheet molding compound material layers 302a-302d. Additionally or alternatively, one or more layers of fiber tape may be wrapped around an outer layer of the hockey stick blade preform 300 (e.g., wrapped around sheet molding compound material layers 302a and 302d).

Advantageously, combining the sheet molding compound material, such as elements 302a-302d, with one or more layer of fiber tape, or pre-impregnated carbon layers, may result increased hockey stick strength and impact resistance. For example, the length of the chopped fibers within the sheet molding compound material may limit the elongation of the sheet molding compound material structure. However, the unidirectional fibers of, for example, the fiber tape, may allow for increased displacement. Further, the sheet molding compound material may have random fiber orientation combined with a certain overlap between the fibers. When compressed (e.g., during molding), the material may flow and the fibers move, which may lead to a changed fiber orientation and/or shorter fiber overlaps. When combined with one or more woven layers of fiber-reinforced material, the combined structure of the sheet molding compound material and the woven layers may result in increased impact resistance.

In one implementation, the hockey stick blade preform 300 may use a foam core onto which the sheet molding compound material layers 302a-302d are applied. The foam core may use any foam type. In another example, a core of the hockey stick blade preform 300 may be made from one or more layers of sheet molding compound material, similar to material layers 302a-302d. In yet another example, a core of a hockey stick blade preform 300 may include a foam wrapped with a pre-impregnated carbon layers/fiber tape material. These core structures may be used in any implementation of a hockey stick blade that uses sheet molding compound material, such as blades 900 and 1000, described in further detail in the proceeding disclosure.

Additionally or alternatively, two or more different types of sheet molding compound material may be used in the hockey stick blade preform 300. The different types of sheet molding compound material may have different mechanical properties, once molded, that result from, among others, differing material thicknesses, differing resins used to entrain the fibers, differing fiber materials, and/or differing average fiber lengths, or combinations thereof. In one example, the sheet molding compound material layers 302a and 302d may use a first sheet molding material type that has a first average fiber length, and sheet molding compound material layers 302b and 302c may use a second sheet molding material type that has a second average fiber length. In one example, the first average fiber length may be 10 mm or less, and the second average fiber length may be 20 mm or more, or 25.4 mm or more. It is noted that these values are for illustrative purposes only, and may be swapped in the example implementation of FIG. 3. Additionally, the average fiber length of fibers entrained within a sheet molding compound material, as described herein, may measure approximately 5 mm, 10 mm, 15, mm, 20 mm, 25 mm, 30 mm, 35 mm, or 40 mm or more. Further, it is contemplated that any fiber lengths may be used in the sheet molding compound materials described herein, or combinations of different fiber lengths, without departing from the scope of these disclosures. In one example, a sheet molding compound material with a longer fiber length may be used to provide added durability to one or more areas of a hockey stick blade or another hockey stick structure (e.g., a portion of a stick shaft, among others).

In one implementation, a first sheet molding compound material having randomly oriented fibers may be positioned at areas/regions of a hockey stick blade structure that are subjected to comparatively higher and/or more frequent impacts. A second sheet molding compound material having randomly oriented fibers that are shorter than those of the first sheet molding compound material may be positioned at areas/regions of a hockey stick blade structure that are subjected to comparatively lower and/or less frequent impacts or none or minimal amounts of fibers can be provided in the low impact areas. For example, a sheet molding compound material with comparatively longer average fiber lengths may be used in the heel region 110 of blade 100 and/or in the middle region of the blade and the remainder of the blade may include shorter fibers or minimal or no random fibers at all. In another example, a sheet molding competent material having comparatively longer lengths of randomly oriented fibers may be used to provide added durability to a lower half of the blade surface.

Figure 4:
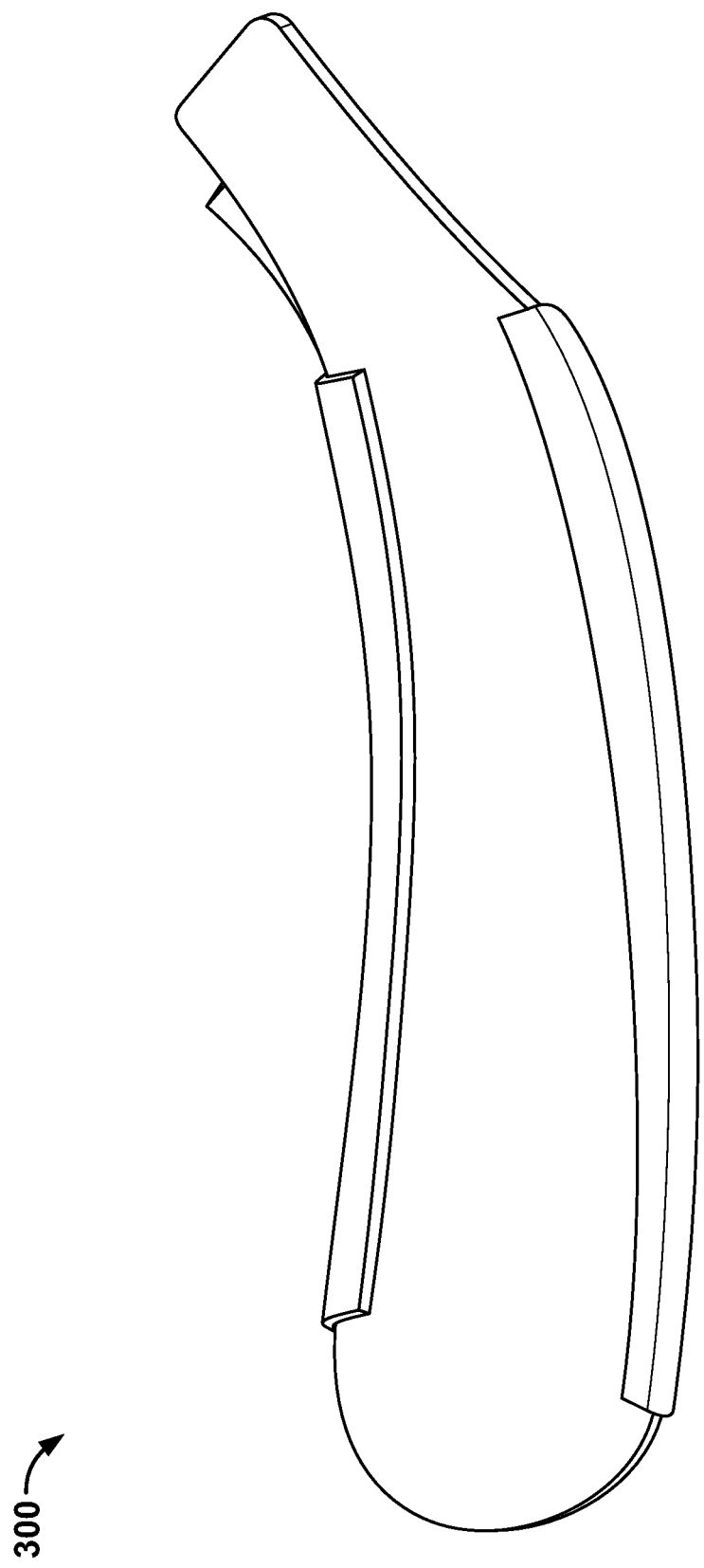
FIG. 4 depicts the hockey stick blade preform of FIG. 3 after all layers of the sheet molding compound material have been cut to a desired shape and layered in a manner ready to be positioned within a mold, according to one or more aspects described herein.
Figure 5:
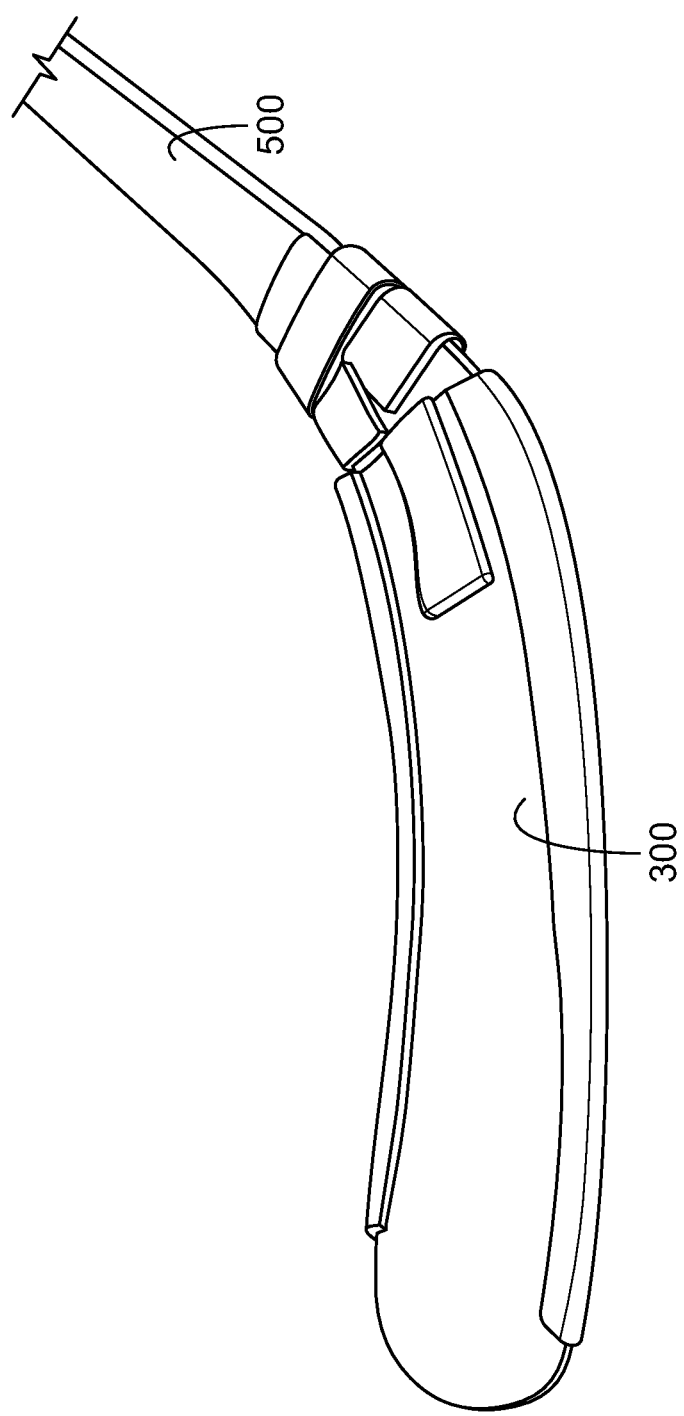
FIG. 5 depicts a molded hockey stick shaft that is coupled to the hockey stick blade preform of FIG. 3, according to one or more aspects described herein.

FIG. 4 depicts the hockey stick blade preform 300 after all layers of sheet molding compound material have been cut to a desired shape and layered in a manner ready to be positioned within a mold. In one example, and as depicted in FIG. 5, a molded hockey stick shaft may be coupled to the hockey stick blade preform 300 prior to molding of the preform 300. In one example, the hockey stick shaft 500 may be constructed using one or more layers of sheet molding compound material, and using methodology similar to that described in relation to the manufacturer of the hockey stick blade.

Figure 6:
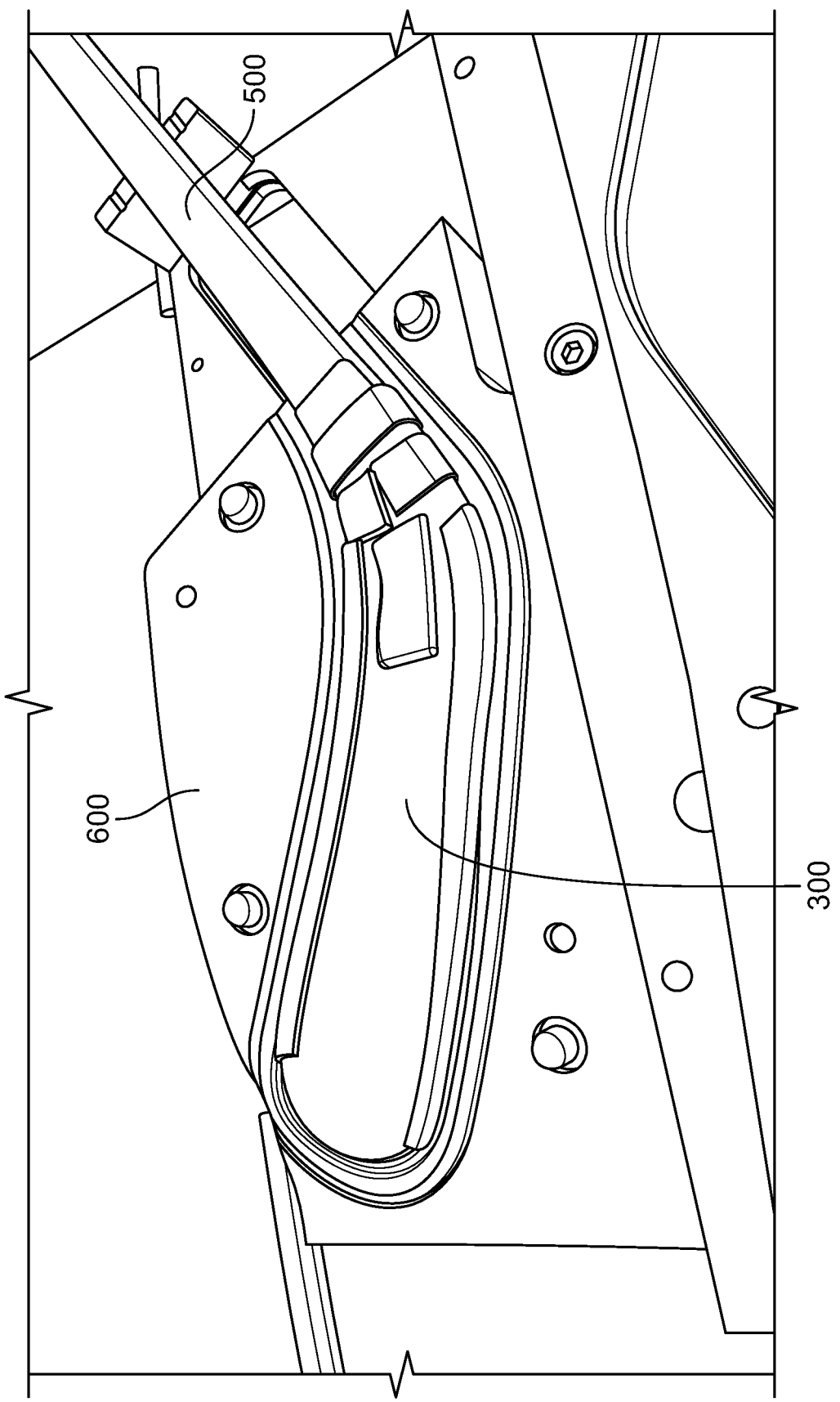
FIG. 6 depicts the hockey stick blade preform of FIG. 3 and the hockey stick shaft of FIG. 5 within one half of a mold, according to one or more aspects described herein.

FIG. 6 depicts the hockey stick blade preform 300 and the hockey stick shaft 500 within one half of a mold 600. The mold 600 may be configured to impart a desired hockey stick blade curvature and final geometry to the blade preform 300. Accordingly, the mold 600 may be constructed from a metal, alloy, or another material capable of withstanding the high temperature and pressure associated with molding of the preform 300. Further, it is contemplated that the mold 600 may be a female-female type mold, or a female-male type mold, without departing from the scope of these disclosures. It is contemplated that a mold release agent material, and/or a mechanical release mechanism may be used to remove the molded hockey stick blade from the mold cavity.

The hockey stick blade preform 300 may be heated and cooled within the mold 600. Additionally, the mold 600 may apply pressure to the preform 300 in order to impart a desired shape to the formed hockey stick blade. It is contemplated that any pressure and temperature values may be used, without departing from the scope of these disclosures. Advantageously, the use of sheet molding compound material in the hockey stick blade preform 300 may decrease the curing time to mold the preform 300 into a finished hockey stick blade. In one example, the curing time may be reduced by a factor of 10 or more when compared to a hockey stick blade constructed using layers of fiber tape, and without using sheet molding compound material. In one specific implementation, the hockey stick blade preform 300 may be cured and removable from the mold 600 in less than 20 minutes, less than 10 minutes, or less than 5 minutes from a start of a heating and cooling sequence of the mold 600. It is further contemplated that the mold 600 may be heated and cooled within any suitable device or environment, without departing from the scope of these disclosures.

Figure 7:
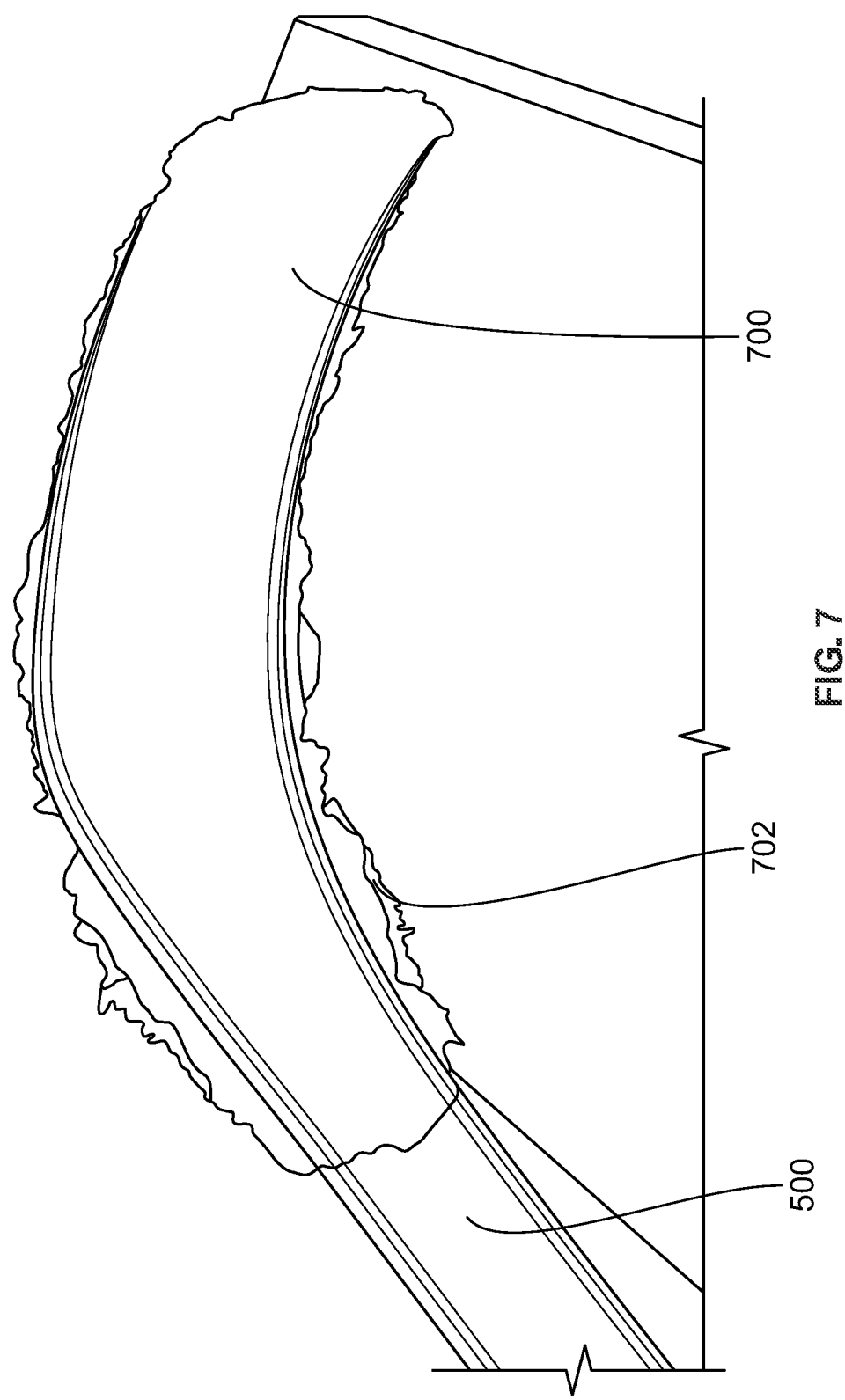
FIG. 7 depicts a molded hockey stick blade integrally formed with a hockey stick shaft following removal from the mold of FIG. 6, according to one or more aspects described herein.

FIG. 7 depicts a molded hockey stick blade 700 integrally formed with the hockey stick shaft 500, and following removal from the mold 600 depicted in FIG. 6. As shown in FIG. 7, the molded hockey stick blade 700 includes flashing material 702 that may be manually or mechanically removed from the molded hockey stick blade 700 to produce a completed hockey stick blade 700.

Figure 8:
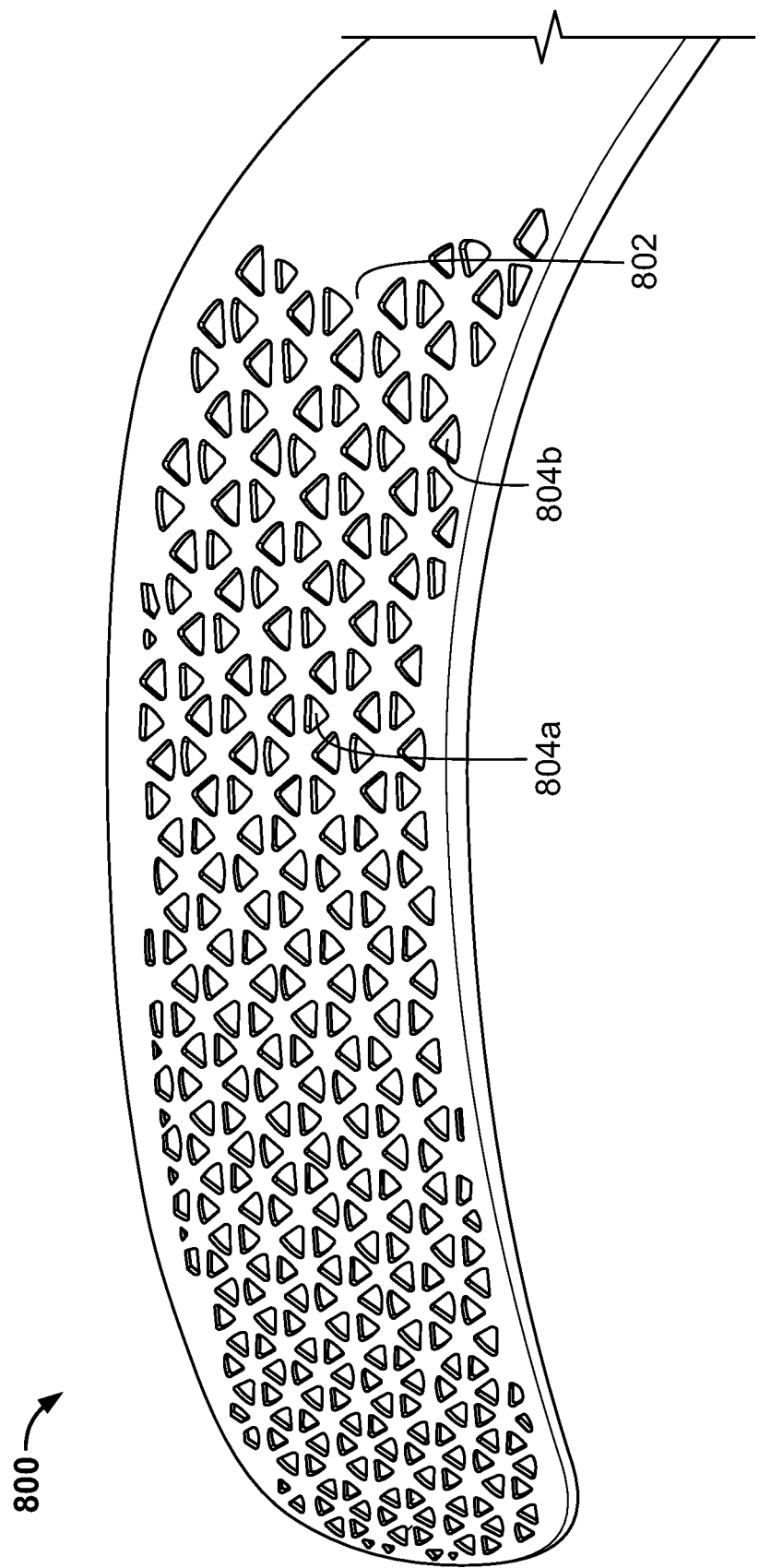
FIG. 8 depicts another implementation of a hockey stick blade structure that may be constructed using layers of sheet molding compound material, according to one or more aspects described herein.

FIG. 8 depicts another implementation of a hockey stick blade structure 800 that may be constructed using layers of sheet molding compound material. As depicted, the hockey stick blade structure 800 includes cutout features on an outer face 802. In one example, the outer face 802 may be similar to the second outer face 108 described in relation FIG. 1. In one specific example, the cutout features are positioned on a back face 802 of the hockey stick blade structure 800. Cutout features 804*a* and 804*b* are two examples of the cutout features on the face 802. Further, the depicted geometries of the cutout features 804*a* and 804*b* represent merely one example implementation of possible geometries. For example, cutout features having circular, triangular, square, rectangular, star, oval, pentagonal, hexagonal, heptagonal, or octagonal geometries, or combinations thereof, among others may be used in in addition to or as an alternative to cutout features 804*a* and 804*b*. Additionally, similar cutout features may be included on a front face of the hockey stick blade structure 800, or another portion of a hockey stick constructed using sheet molding compound material. In one example, the cutout features 804*a* and 804*b* may be formed by removing material from one or more outer layers of sheet molding compound material used to form the hockey stick blade structure 800. This material may be removed using any applicable material removal process, such as, among others, die-cutting, stamping, laser-cutting, or milling, or combinations thereof. Additionally or alternatively, one or more internal (non-visible) sheet molding compound material layers of the hockey stick blade structure 800 may include cutout features similar to those features 804*a* and 804*b*. Advantageously, the cutout features 804*a* and 804*b* may reduce the mass of the hockey stick blade structure 800 and/or provide variable mechanical stiffness at predetermined areas of the blade structure 800. The cutout features may otherwise be referred to as ribbing features, or ribs, and may configured to augment the mechanical properties of the stick blade structure 800. For example, ribbing elements may be implemented as cutout elements on a surface or face 802 of the hockey stick blade structure 800, and may adjust the rigidity/flexibility of the blade 800, among others. In another example, ribbing elements may be included within the hockey stick blade structure 800 such that they are not visible on an external surface.

In one example, ribbing and/or cutout features may be present on one side of a stick blade structure, such as stick blade structure 800, and an opposite side may have an outer surface with a glossy and/or smooth surface finish on which a pattern formed by randomly oriented fibers of a sheet molding compound material are visible. For example, a forehand side of a stick blade, such as stick blade 800, may have an outer surface with a glossy and smooth outer surface with a pattern of randomly oriented fibers visible, and a backhand side of the stick blade may have one or more ribbing and/or cutout features, similar to cutout features 804*a* and 804*b*. Alternatively, a forehand side of a stick blade may have ribbing and/or cutout features, and a backhand side of the stick blade may have a smooth outer surface on which a pattern formed by randomly oriented fibers within a sheet molding, material are visible. In another example, ribbing and/or cutout features may be present on both a forehand and a backhand side of a hockey stick blade, among others.

Alternatively, an outer surface of a stick blade or other hockey stick element formed using sheet molding compound material may exhibit different outer surface finishes, while still displaying a pattern formed by visible randomly oriented fibers within the outer layer of sheet molding compound material. For example, an outer surface may be glossy, matte, smooth, and/or rough in surface finish, and a pattern formed by randomly oriented fibers may still be visible on the outer surface.

Figure 9:
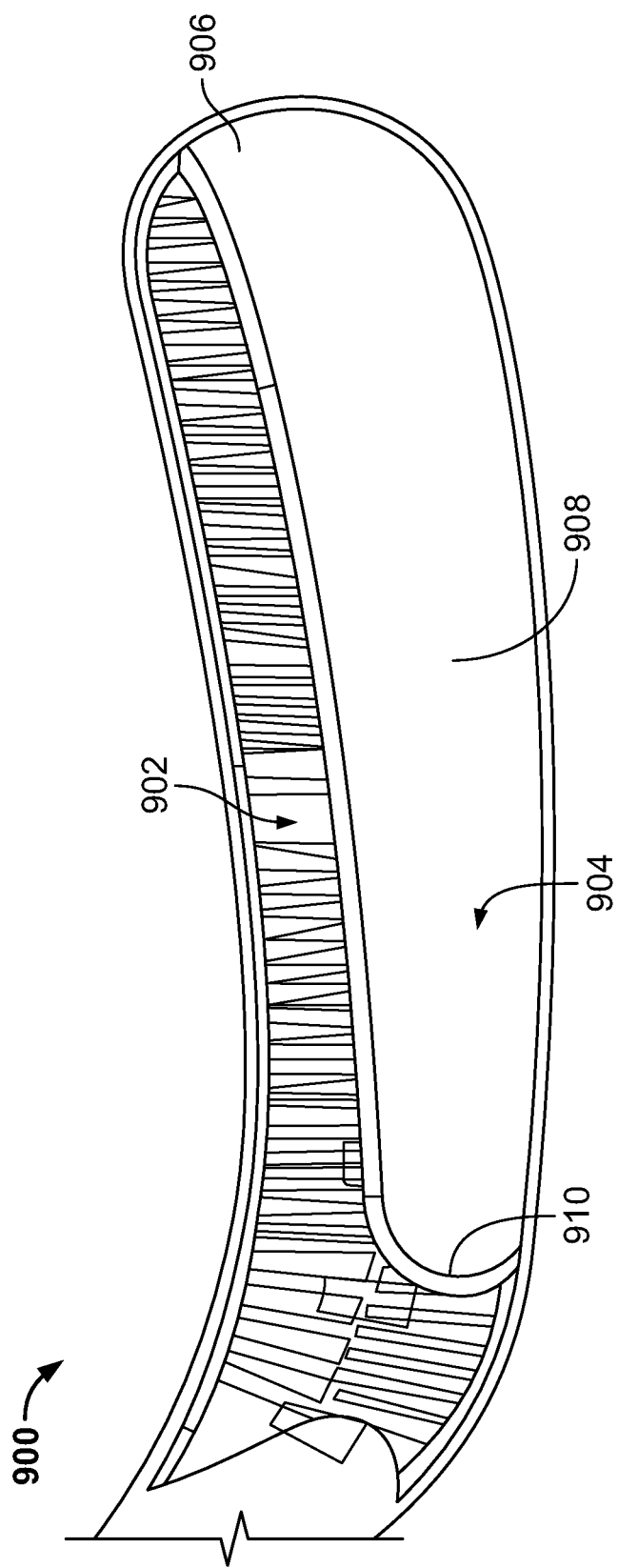
FIG. 9 schematically depicts another implementation of a hockey stick blade structure, according to one or more aspects described herein.

FIG. 9 schematically depicts another example implementation of a hockey stick blade 900. The hockey blade 900 is shown having a toe region 906, a middle region 908 and a heel 910. A core portion 902 of the hockey blade 900 may be formed of a first sheet molding compound material that has comparatively shorter randomly oriented fibers. A second sheet molding compound material may form core portion 904 in order to provide enhanced durability at the lower portion of the hockey stick blade 900. As such, the second sheet molding compound material may have comparatively longer randomly oriented fibers than the first sheet molding compound material that forms the core portion 902. It is contemplated, however, that the core portion 904 may have differing geometries, without departing from the scope of these disclosures. For example, the core portion 904 make cover a greater portion or a lesser portion of the hockey blade 900, without departing from the scope of these disclosures.

Figure 10:
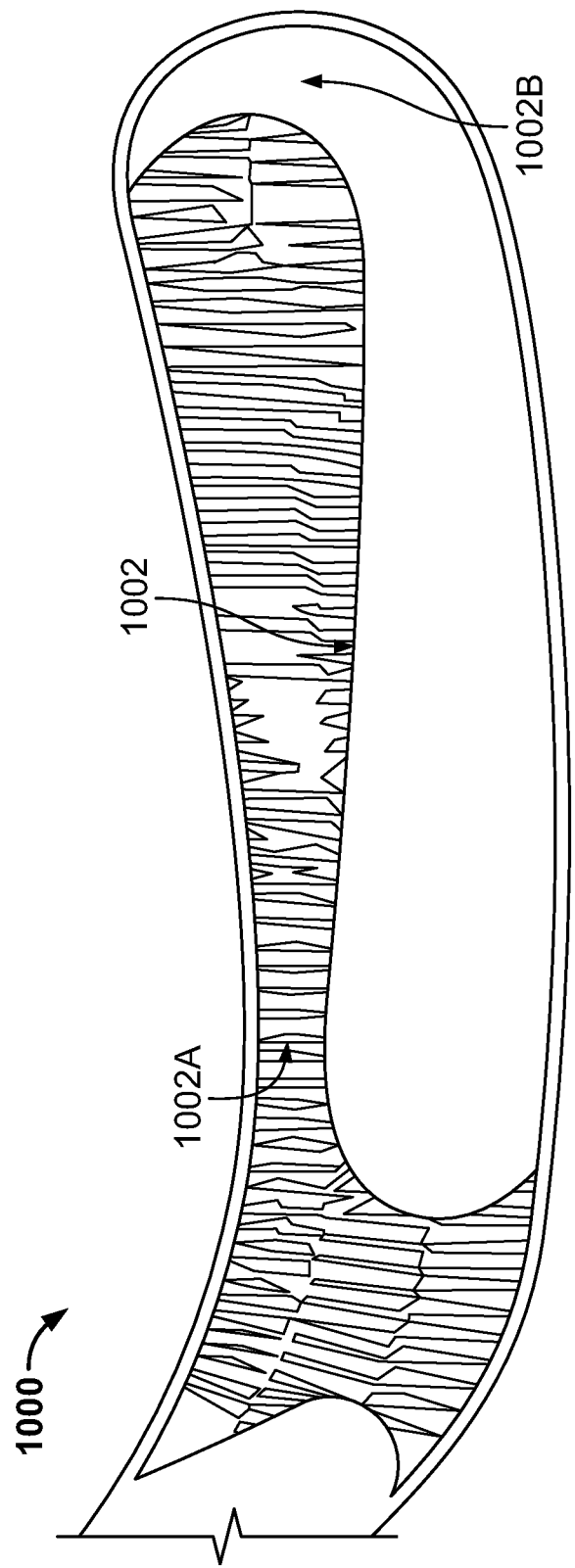
FIG. 10 schematically depicts another implementation of a hockey stick blade structure, according to one or more aspects described herein.

FIG. 10 schematically depicts another implementation of a hockey stick blade 1000. In particular, FIG. 10 schematically depicts an internal view of a blade structure 1000. The blade structure 1000 may be similar to blade 900, and include two or more different types of sheet molding compound material. In one example, the core 1002 of the blade 1000 has first and second core portions 1002A and 1002B that are formed with an oval-like shape at one end and a hook shape at the other end to receive the respective oval-like shaped ends. In one example, the second core portion 1002B may be constructed from a sheet molding compound material that has longer randomly oriented fibers than the randomly oriented fibers of the first core portion 1002A.

Figures 11A, 11B:
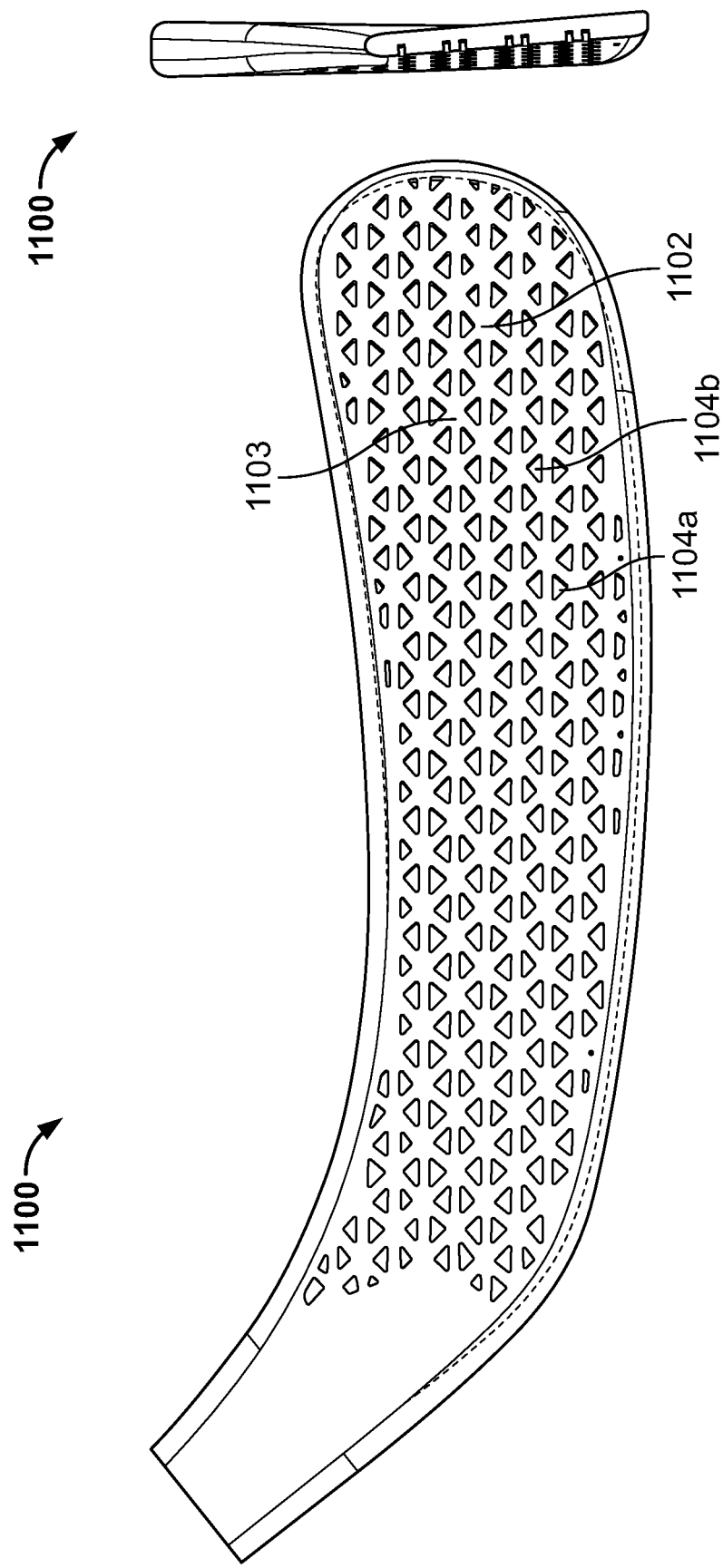
FIGS. 11A and 11B schematically depict another implementation of a hockey stick blade structure that may be constructed using layers of sheet molding compound material, according to one or more aspects described herein.

FIGS. 11A and 11B schematically depict another implementation of a hockey stick blade structure 1100 that may be constructed using layers of sheet molding compound material, according to one or more aspects described herein. In the depicted example, the hockey stick blade structure 1100 includes ribbing features on an outer face. Features 1102 and 1103 are exemplary ribbing features from a plurality of ribbing features on the outer surface of the hockey stick blade structure 1100. The features 1104a and 1104b may be cutout features, or protrusions from the outer surface of the hockey stick blade structure 1100. Further, the features 1104a and 1104b are exemplary cutout features from a plurality of features on the outer surface of the hockey stick blade structure 1100. As depicted, the features 1104a and 1104b are implemented with triangular geometries. However, additional or alternative feature geometries may be used, without departing from the scope of these disclosures. Accordingly, the features 1104a and 1104b, may form structural elements therebetween (otherwise referred to as ribs or ribbing elements). FIG. 11B schematically depicts a cross-sectional view through a portion of the hockey stick blade structure 1100 of FIG. 11A. Accordingly, the features 1104a and 1104b may be implemented on a backhand outer face of the blade structure 1100. However, it is contemplated that similar features may be used on a forehand outer face of the blade structure 1100, without departing from the scope of these disclosures.

In one implementation, the ribbing features 1102 and 1103 may be implemented as linear elements that intersect one another on the backhand outer face of the blade structure 1100. It is contemplated that the ribbing features 1102 and 1103 may have any orientations relative to one another, and relative to the overall blade structure 1100 geometry. In one specific example, the ribbing features 1102 and 1103 may be oriented at 45° relative to one another. This specific orientation may enhance the torsional stiffness of the blade structure 1100. However, additional or alternative orientations may be used, without departing from the scope of these disclosures. In other examples, the ribbing features 1102 and 1103 may be implemented as randomly positioned elements on the backhand outer face of the blade structure 1100. Further, in one example, the ribbing features 1102 and 1103 may extend from the surface of the hockey stick blade structure 1100, and increase the rigidity of the blade. In particular, the ribbing features 1102 and 1103 may exhibit greater stiffness than the surrounding blade cutout features 1104a and 1104b.

In one example, the ribbing features 1102 and 1103 may be formed by imparting the geometries of the features 1104a and 1104b using a mold, and/or one or more machining processes. Additionally or alternatively, the blade structure 1100 may be formed using multiple layers of sheet molding compound material, and one or more outer layers of the multiple layers of sheet molding compound material may include the geometries of the features 1102, 1103, and 1104a-b before those one or more outer layers of the sheet molding compound material are added to form the blade structure 1100.

In one implementation, a formed hockey stick blade structure may be fabricated using a method that includes forming a sheet molding compound material. The sheet molding compound material may be formed by introducing randomly oriented fiber strands in between layers of resin paste. The sheet molding compound material may be solidified to result in a composite in the form of a flexible sheet. The sheet molding compound material may be cut into preform layers and the preform layers may be positioned within a mold. The mold may be heated and cooled and the cured hockey blade structure may be removed from the mold.

In one example, the fiber strands within the sheet molding compound material may measure at least 10 mm in length, or at least 25.4 mm in length.

In another example, the method of fabricating a formed hockey stick blade structure may additionally include positioning a foam core between a selected two of the preform layers of the sheet molding compound material in the mold. As such, the foam core may be integrally molded within the hockey stick blade structure.

In another example, a first sheet molding compound material may have a first average fiber strand length of fibers that are randomly oriented within the first sheet molding compound material and a second sheet molding compound material may have a second average fiber strand length of fibers that are randomly oriented within the second sheet molding compound material. The first and second sheet molding compound materials may be cut to form the preform layers such that a molded hockey stick blade structure may include a first portion that has fibers with a first average strand length and a second portion that has fibers with a second average strand length.

In one example, the first average fiber strand length may be shorter than the second average fiber strand length, and the second sheet molding compound material (and preform layers made therefrom) may be positioned at an area of the blade intended to exhibit comparatively higher mechanical toughness.

In one example, a hockey stick blade structure may be formed from less than five preform layers of sheet molding compound material.

The construction of a molded hockey stick blade structure may additionally include positioning a layer of fiber tape in a mold with preform layers of sheet molding compound material. The fiber tape may be pre-impregnated with resin and have unidirectional fibers.

The fibers of the sheet molding compound material may include carbon fibers or glass fibers, among others.

In one example, the heating and cooling of the mold to a time when the molded hockey stick blade structure may be removed from the mold may be completed in less than 10 minutes.

In another example, rib structures may be formed within a preform layer, of the preform layers of sheet molding compound material used to construct a hockey stick blade structure. The rib structures may be formed by removing material from a preform layer prior to positioning the preform layer in a mold.

Additionally, polymer inserts may be added to the mold and integrally molded with the hockey stick blade structure.

In another implementation, a hockey stick blade structure may be formed by a method that includes forming a first sheet molding compound material by introducing randomly oriented fiber strands having a first average length in between layers of resin paste, and solidifying a resultant composite into a first flexible sheet. A second sheet molding compound material may be formed by introducing randomly oriented fiber strands having a second average length, longer than the first average length, in between layers of resin paste and solidifying a resultant composition into a second flexible sheet. The first and second sheet molding compound materials may be cut into preform layers, and the preform there is positioned in a mold. The mold may subsequently be heated and cooled, and a formed hockey stick blade structure may be removed from the mold.

In one example, the first average length of the first sheet molding compound material fibers may be less than 10 mm and the second average length of the second sheet molding compound material fibers may be greater than 20 mm.

In another example, a foam core may be positioned between a selected two of the preform layers of the sheet molding compound material and the mold to be integrally molded within the hockey stick blade structure.

In one example, the hockey stick blade structure may be formed from less than five preform layers of sheet molding compound material.

A layer of fiber tape may be positioned in the mold with the preform layers, with the fiber tape being pre-impregnated with resin and having unidirectional fibers. Further, the fiber strands may be carbon fibers or glass fibers, among others.

A hockey stick blade apparatus may include a first preform layer formed from a first sheet molding compound material, the first sheet molding compound material formed by introducing randomly oriented fiber strands having a first average length in between layers of resin paste. The hockey stick blade apparatus may additionally include a second preform layer formed from a second sheet molding compound material, the second sheet molding compound material formed by introducing randomly oriented fiber strands having a second average length in between layers of resin paste. Further, the first preform layer on the second preform layer may be heated and cooled in a mold to form a hockey stick blade apparatus.

In one example, a layer of fiber tape may be integrally molded with the hockey stick blade apparatus, with the layer of fiber tape being pre-impregnated with resin and having unidirectional fibers.

The hockey stick blade apparatus may be molded and removable from the mold in less than 10 minutes.

In one example, a hockey stick blade apparatus may have a first face and a second face, and at least one of the first face and the second face has a high-gloss surface finish on which randomly oriented fiber strands are visible.

In another example, a hockey stick blade may have a first face and a second face, and at least one of the first face and the second face has a series of coded features.

A hockey stick blade may have a toe region, a mid region, and a heel region, and randomly chopped fibers may be provided at the mid region and the heel region of the blade.

In another implementation, a hockey stick blade may have a first face and a second face, and one of the first face or the second face may have a high-gloss surface finish that has randomly oriented fiber strands visible thereon, and the other of the first face and the second face may have a series of ribbing and/or cutout features.

In one example, a first face of a hockey stick blade may be a forehand portion of the blade, and a second face may be a backhand portion of the blade, and the first face may have a high-gloss surface finish having visible randomly oriented fiber strands, and the second face may have a series of cutout features. Further, the series of cutout features may be triangularly shaped.

A hockey stick blade may have a toe region, a mid region, and a heel region, and the randomly oriented fiber strands may be provided at the mid region on the heel region of the blade.

The randomly oriented fiber strands may measure greater than or equal to 10 mm in length.

A hockey stick blade may have a first half and a second half and a majority of the randomly oriented fiber strands may be located within the first half of the hockey stick blade.

A hockey stick blade may have a top half and a bottom half, and a majority of randomly oriented fiber strands may be located within the bottom half of the hockey stick blade.

The present disclosure is disclosed above and in the accompanying drawings with reference to a variety of examples. The purpose served by the disclosure, however, is to provide examples of the various features and concepts related to the disclosure, not to limit the scope of the invention. One skilled in the relevant art will recognize that numerous variations and modifications may be made to the examples described above without departing from the scope of the present disclosure.

Exemplary Clauses

1. A method of fabricating a formed hockey blade structure, comprising: forming a sheet molding compound material by introducing randomly oriented fiber strands in between layers of resin paste and solidifying a resultant composite into a flexible sheet; cutting the sheet molding compound material into preform layers; positioning the preform layers in a mold; heating and cooling the mold; and removing a formed hockey blade structure from the mold.
2. The method of clause 1, wherein the fiber strands measure at least 10 mm in length.
3. The method of clause 1, wherein the fiber strands measure at least 25.4 mm in length.
4. The method of clause 1, further comprising: positioning a foam core between a selected two of the preform layers of the sheet molding compound material in the mold to be integrally molded within the hockey stick blade structure.
5. The method of clause 1, wherein the sheet molding compound material is a first sheet molding compound material having a first average fiber strand length, and the preform layers are first preform layers, the method further comprising: forming a second sheet molding compound material by introducing randomly oriented fiber strands having a second average fiber strand length in between layers of resin paste and solidifying a resultant composite into a flexible sheet; cutting the second sheet molding compound material into second preform layers; and positioning the second preform layers with the first preform layer in the mold.
6. The method of clause 5, wherein the second average fiber length is longer than the first average fiber length, and the second preform layers are positioned at areas of the blade intended to exhibit comparatively higher mechanical toughness.
7. The method of clause 1, wherein the blade structure is formed from less than five preform layers.
8. The method of clause 1, further comprising: positioning a layer of fiber tape in the mold with the preform layers, the fiber tape being pre-impregnated with resin and having unidirectional fibers.
9. The method of clause 1, wherein the fiber strands comprise carbon fibers.
10. The method of clause 1, wherein the fiber strands comprise glass fibers.
11. The method of clause 1, wherein the heating and cooling the mold and removing the formed hockey blade structure from the mold is completed in less than 10 minutes.
12. The method of clause 1, further comprising: forming rib structures in a preform layer, selected from the preform layers, by removing material form the preform layer prior to positioning the preform layers in the mold.
13. The method of clause 1, further comprising: positioning polymer inserts in the mold to be integrally molded within the hockey blade structure.
14. A hockey stick blade structure formed by a method comprising the steps of: forming a first sheet molding compound material by introducing randomly oriented fiber strands having a first average length in between layers of resin paste and solidifying a resultant composite into a first flexible sheet; forming a second sheet molding compound material by introducing randomly oriented fiber strands having a second average length, longer than the first average length, in between layers of resin paste and solidifying a resultant composite into a second flexible sheet; cutting the first and second sheet molding compound materials into preform layers; positioning the preform layers in a mold; heating and cooling the mold; and removing a formed hockey blade structure from the mold.

15. The hockey stick blade structure of clause 14, wherein the first average length is less than 10 mm and the second average length is greater than 20 mm.

16. The hockey stick blade structure of clause 14, wherein the method further comprises: positioning a foam core between a selected two of the preform layers of the sheet molding compound material in the mold to be integrally molded within the hockey stick blade structure.

17. The hockey stick blade structure of clause 14, wherein the blade structure is formed from less than five preform layers.

18. The hockey stick blade structure of clause 14, wherein the method further comprises: positioning a layer of fiber tape in the mold with the preform layers, the fiber tape being pre-impregnated with resin and having unidirectional fibers.

19. The hockey stick blade structure of clause 14, wherein the fiber strands comprise carbon fibers.

20. The hockey stick blade structure of clause 14, wherein the fiber strands comprise glass fibers.

21. A hockey stick blade apparatus, comprising: a first preform layer formed from a first sheet molding compound material, the first sheet molding compound material formed by introducing randomly oriented fiber strands having a first average length in between layers of resin paste; and a second preform layer formed from a second sheet molding compound material, the second sheet molding compound material formed by introducing randomly oriented fiber strands having a second average length in between layers of resin paste, wherein the first preform layer and the second preform layer are heated and cooled in a mold to form the hockey stick blade apparatus.

22. The hockey stick blade apparatus of clause 21, further comprising: a layer of fiber tape integrally molded with the hockey stick blade apparatus, the layer of fiber tape being pre-impregnated with resin and having unidirectional fibers.

23. The hockey stick blade apparatus of clause 21, wherein the hockey stick blade apparatus is molded and removable from the mold in less than 10 minutes.

24. The hockey stick blade apparatus of clause 21 wherein the blade comprises a first face and a second face and wherein one of the first face or the second face has a high gloss surface finish where the randomly oriented fiber strands are visible.

25. The hockey stick blade apparatus of clause 21 wherein the blade comprises a first face and a second face and wherein one of the first face or the second face has a series of cutout features.

26. The hockey stick blade apparatus of clause 21 wherein the hockey stick blade comprises a toe region, a mid region, and a heel region and wherein randomly chopped fibers are provided at the mid region and the heel region of the blade.

27. A hockey stick blade comprising a first face and a second face and wherein one of the first face or the second face has a high gloss surface finish having visible randomly oriented fiber strands and the other of the first face or the second face comprises a series of ribbing and cutout features.

28. The hockey stick blade apparatus of clause 27 where in the first face is a forehand portion of the blade and the second face is a backhand portion of the blade and wherein the first face comprises the high gloss surface finish having visible randomly oriented fiber strands and the second face comprises the series of cutout features.

29. The hockey stick blade of clause 28 wherein the series of cutout features are triangularly shaped.

30. The hockey stick blade of clause 27 wherein the hockey stick blade comprises a toe region, a mid region, and a heel region and wherein the randomly oriented fiber strands are provided at the mid region and the heel region of the blade.

31. The hockey stick blade of clause 27 wherein the randomly oriented fiber strands are greater than or equal to 10 mm.

32. The hockey stick blade of clause 27 wherein the hockey stick blade comprises a first half and a second half and wherein a majority of the randomly oriented fiber strands are located at the first half of the hockey stick blade.

33. The hockey stick blade of clause 27 wherein the hockey stick blade comprises a top half and a bottom half and wherein a majority of the randomly oriented fiber strands are located at the bottom half of the hockey stick blade.

We claim:

1. A method of fabricating a formed hockey blade structure, comprising:

positioning preform layers in a mold wherein the preform layers comprise a first sheet molding compound material formed by introducing randomly oriented fiber strands having a first average fiber length in between layers of resin paste and solidifying a resultant composite into a flexible sheet and a second sheet molding compound material formed by introducing randomly oriented fiber strands having a second average fiber length, longer than the first average fiber length, in between layers of resin paste and solidifying a resultant composite into a second flexible sheet;

positioning the second sheet molding compound material to be integrally molded only at a heel area and middle area of the hockey blade structure and positioning the first sheet molding compound material to be integrally molded only at a remainder of the hockey blade structure;

positioning a foam core between a selected two of the preform layers of the sheet molding compound material in the mold to be integrally molded within the hockey blade structure;

positioning one or more layers of fiber tape between each layer of the preform layers or a subset of the preform layers;

heating and cooling the mold; and removing a formed hockey blade structure from the mold;

wherein the formed hockey blade structure has an outer face comprising a back face and a front face.

2. The method of claim 1, wherein the first average fiber length measures 10 mm or less in length.

3. The method of claim 1, wherein the second average fiber length measures at least 2 mm in length.

4. The method of claim 1, wherein the hockey blade structure is formed from less than five preform layers.

5. The method of claim 1, wherein the fiber tape is pre-impregnated with resin and comprises unidirectional fibers.

6. The method of claim 1, wherein the fiber strands comprise carbon fibers.

7. The method of claim 1, wherein the fiber strands comprise glass fibers.

8. The method of claim 1, wherein the heating and cooling the mold and removing the formed hockey blade structure from the mold is completed in less than 10 minutes.

9. The method of claim 1, further comprising:
forming rib structures in a preform layer, selected from the preform layers, by removing material from the preform layer prior to positioning the preform layers in the mold.

10. The method of claim 1, further comprising:
positioning polymer inserts in the mold to be integrally molded within the hockey blade structure.

11. A hockey stick blade structure formed by a method comprising the steps of:
utilizing a first sheet molding compound material formed by introducing randomly oriented fiber strands having a first average length in between layers of resin paste and solidifying a resultant composite into a first flexible sheet;
utilizing a second sheet molding compound material formed by introducing randomly oriented fiber strands having a second average length, longer than the first average length, in between layers of resin paste and solidifying a resultant composite into a second flexible sheet;
wherein the first sheet molding compound material and the second sheet molding compound material comprise preform layers and wherein the second sheet molding compound material is positioned to be integrally molded only at a heel area and middle area of the hockey stick blade structure and the first sheet molding compound material is positioned to be integrally molded only at a remaining area of the hockey stick blade structure;
positioning the preform layers in a mold and positioning at least one fiber tape layer between the preform layers;
positioning a foam core between a selected two of the preform layers in the mold to be integrally molded within the hockey stick blade structure;
heating and cooling the mold and
removing a formed hockey blade structure from the mold, wherein the heating and cooling the mold and removing the formed hockey blade structure from the mold is completed in less than 10 minutes;
wherein the hockey blade structure has an outer face comprising a back face and a front face.

12. The hockey stick blade structure of claim 11, wherein the first average length is less than 10 mm and the second average length is greater than 20 mm.

13. The hockey stick blade structure of claim 11, wherein the hockey stick blade structure is formed from less than five preform layers.

14. The hockey stick blade structure of claim 11, wherein the fiber tape is pre-impregnated with resin and has unidirectional fibers.

15. The hockey stick blade structure of claim 11, wherein the fiber strands comprise carbon fibers.

16. The hockey stick blade structure of claim 11, wherein the fiber strands comprise glass fibers.

17. A hockey stick blade structure formed by a method comprising the steps of:
utilizing a first sheet molding compound material formed by introducing randomly oriented fiber strands having a first average length in between layers of resin paste and solidifying a resultant composite into a first flexible sheet;
utilizing a second sheet molding compound material formed by introducing randomly oriented fiber strands having a second average length, longer than the first average length, in between layers of resin paste and solidifying a resultant composite into a second flexible sheet;
wherein the first sheet molding compound material and the second sheet molding compound material comprise preform layers and wherein the second sheet molding compound material is positioned to be integrally molded only at a lower half of the hockey stick blade structure and the first sheet molding compound material is positioned to be integrally molded only at a remaining half of the hockey stick blade structure;
positioning the preform layers in a mold;
positioning a foam core between a selected two of the preform layers in the mold to be integrally molded within the hockey stick blade structure;
heating and cooling the mold and
removing a formed hockey blade structure from the mold;
wherein the hockey blade structure has an outer face comprising a back face and a front face.

18. The hockey stick blade structure of claim 17, wherein the first average length is less than 10 mm and the second average length is greater than 20 mm.

19. The hockey stick blade structure of claim 17, wherein the hockey stick blade structure is formed from less than five preform layers.

20. The hockey stick blade structure of claim 17, further comprising positioning at least one fiber tape layer between the preform layers.

21. The hockey stick blade structure of claim 20 wherein the fiber tape is pre-impregnated with resin and has unidirectional fibers.

22. The hockey stick blade structure of claim 17, wherein the fiber strands comprise carbon fibers.

23. The hockey stick blade structure of claim 17, wherein the fiber strands comprise glass fibers.

24. A hockey stick blade structure formed by a method comprising the steps of:
utilizing a first sheet molding compound material without fiber strands;
utilizing a second sheet molding compound material formed by introducing randomly oriented fiber strands in between layers of resin paste and solidifying a resultant composite into a second flexible sheet;
wherein the first sheet molding compound material and the second sheet molding compound material comprise preform layers and wherein the second sheet molding compound material is positioned to be integrally molded only at a heel and a middle region of the hockey stick blade structure and the first sheet molding compound material is positioned to be integrally molded only at a remainder of the hockey stick blade structure;
positioning the preform layers in a mold;

positioning a foam core between a selected two of the preform layers in the mold to be integrally molded within the hockey stick blade structure; and heating and cooling the mold and removing a formed hockey blade structure from the mold;

wherein the hockey blade structure has an outer face comprising a back face and a front face.

25. The hockey stick blade structure of claim 24, wherein the hockey stick blade structure is formed from less than five preform layers.

26. The hockey stick blade structure of claim 24, further comprising positioning at least one fiber tape layer between the preform layers.

27. The hockey stick blade structure of claim 26 wherein the fiber tape is pre-impregnated with resin and has unidirectional fibers.

28. The hockey stick blade structure of claim 24, wherein the fiber strands comprise carbon fibers.

* * * * *